(12) United States Patent
Furunes et al.

(10) Patent No.: US 11,807,416 B2
(45) Date of Patent: Nov. 7, 2023

(54) TRANSPORT PALLET

(71) Applicant: BEWI NORPLASTA AS, Stjørdal (NO)

(72) Inventors: Morten Furunes, Skatval (NO); Martin Gudem Ringdalen, Trondheim (NO)

(73) Assignee: BEWI NORPLASTA AS, Stjørdal (NO)

( * ) Notice: Subject to any disclaimer, the term of this patent is extended or adjusted under 35 U.S.C. 154(b) by 0 days.

(21) Appl. No.: 17/635,518

(22) PCT Filed: Aug. 11, 2020

(86) PCT No.: PCT/NO2020/050203
§ 371 (c)(1),
(2) Date: Feb. 15, 2022

(87) PCT Pub. No.: WO2021/029775
PCT Pub. Date: Feb. 18, 2021

(65) Prior Publication Data
US 2022/0332463 A1 Oct. 20, 2022

(30) Foreign Application Priority Data
Aug. 15, 2019 (NO) .................................. 20190983

(51) Int. Cl.
B65D 19/00 (2006.01)

(52) U.S. Cl.
CPC .. B65D 19/004 (2013.01); *B65D 2519/00034* (2013.01); *B65D 2519/00069* (2013.01);
(Continued)

(58) Field of Classification Search
CPC ........ B65D 19/004; B65D 2519/00034; B65D 2519/00069; B65D 2519/00268;
(Continued)

(56) References Cited

U.S. PATENT DOCUMENTS

| 3,680,495 A | 8/1972 | Pike | |
| 6,173,659 B1 * | 1/2001 | Danks | B65D 19/40 108/54.1 |

(Continued)

FOREIGN PATENT DOCUMENTS

| JP | 4814762 U | 2/1973 |
| JP | 2003118736 A | 4/2003 |
| WO | 2019073118 A1 | 4/2019 |

OTHER PUBLICATIONS

International Search Report and Written Opinion dated Nov. 2, 2020 for International Patent Application No. PCT/NO2020/050203.

*Primary Examiner* — Jose V Chen
(74) *Attorney, Agent, or Firm* — Alix, Yale & Ristas, LLP

(57) ABSTRACT

Transport pallet consisting of a first and second opposite short side and a first and second opposite long side. The bearing surface is constituted by a framework consisting of a number of mutually parallel extending elongate ribs and a number of mutually parallel extending transversal ribs extending perpendicularly to the elongate ribs. A number of legs are formed as an extension of the ribs and extend downward from the bearing surface and mutually distributed below the same. The short sides are similarly formed with fork lift pockets. The rib extension is formed with an inclination, so that the legs narrow in a direction away from the pallet underside.

18 Claims, 8 Drawing Sheets

(52) U.S. Cl.
CPC ............. *B65D 2519/00268* (2013.01); *B65D 2519/00308* (2013.01); *B65D 2519/00318* (2013.01); *B65D 2519/00338* (2013.01); *B65D 2519/00402* (2013.01); *B65D 2519/00835* (2013.01)

(58) Field of Classification Search
CPC ........... B65D 2519/00308; B65D 2519/00318; B65D 2519/00338; B65D 2519/00402; B65D 2519/00835
USPC ...................................................... 108/57.25
See application file for complete search history.

(56) References Cited

U.S. PATENT DOCUMENTS

| | | | |
|---|---|---|---|
| 6,250,234 B1* | 6/2001 | Apps ....................... | B29C 65/02 108/57.25 |
| 6,349,656 B1* | 2/2002 | Mitchell ............ | B65D 19/0087 108/901 |
| 6,976,436 B1 | 12/2005 | Sugihara et al. | |
| 11,008,135 B2* | 5/2021 | Spadavecchia ...... | B65D 19/004 |
| D925,159 S* | 7/2021 | Furunes ........................ | D34/38 |
| 2003/0136314 A1* | 7/2003 | Smyers .............. | B65D 19/0012 108/57.26 |
| 2007/0204769 A1* | 9/2007 | Wong ................... | B65D 65/466 108/57.25 |
| 2008/0236455 A1* | 10/2008 | Naidu ................ | B65D 19/0038 24/453 |
| 2009/0007824 A1* | 1/2009 | Dubois .................. | B65D 19/40 108/57.25 |
| 2011/0179978 A1 | 7/2011 | Schmitt | |
| 2012/0304898 A1* | 12/2012 | Dubois ............. | B65D 19/0063 108/57.25 |
| 2013/0032507 A1* | 2/2013 | Du Toit ............. | B65D 19/0018 206/599 |
| 2015/0274357 A1* | 10/2015 | Linares .............. | B65D 19/0012 428/221 |
| 2017/0027411 A1* | 2/2017 | Gobi ....................... | B08B 13/00 |
| 2019/0135485 A1* | 5/2019 | Apps ............... | B65D 19/0038 |
| 2019/0144163 A1* | 5/2019 | Lim ...................... | B65D 19/40 108/53.5 |
| 2019/0308769 A1* | 10/2019 | Apps ................ | B65D 19/0063 |
| 2019/0359378 A1* | 11/2019 | White ................... | B65D 19/38 |
| 2020/0231332 A1* | 7/2020 | Apps ................ | B65D 19/0036 |
| 2021/0039830 A1* | 2/2021 | Kalinowski .......... | B65D 19/004 |
| 2021/0147112 A1* | 5/2021 | Cohen ............... | B65D 19/004 |
| 2022/0144487 A1* | 5/2022 | Dehmel ............. | B65D 19/0048 |

* cited by examiner

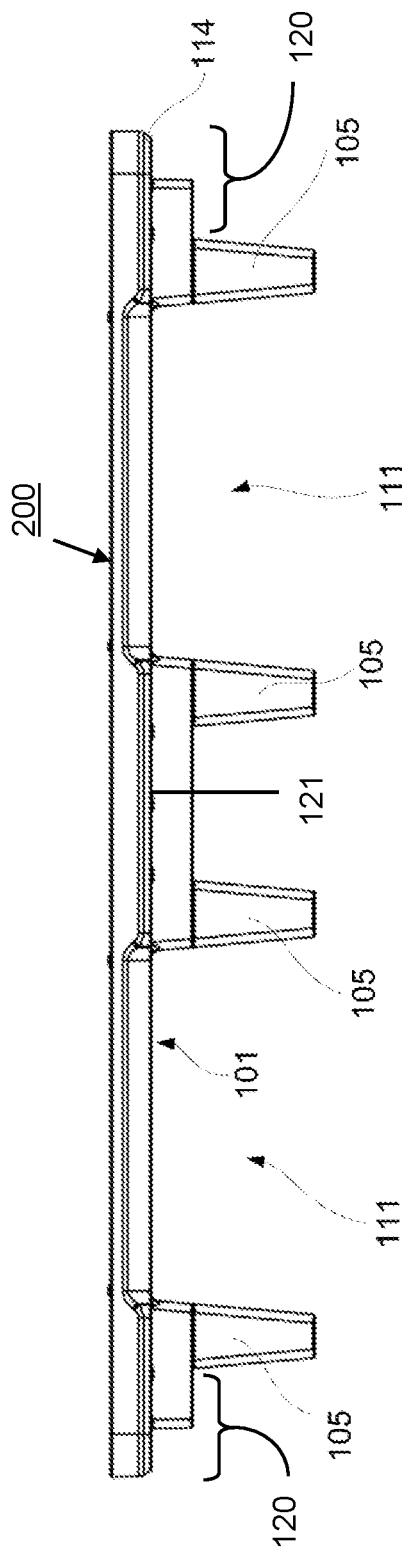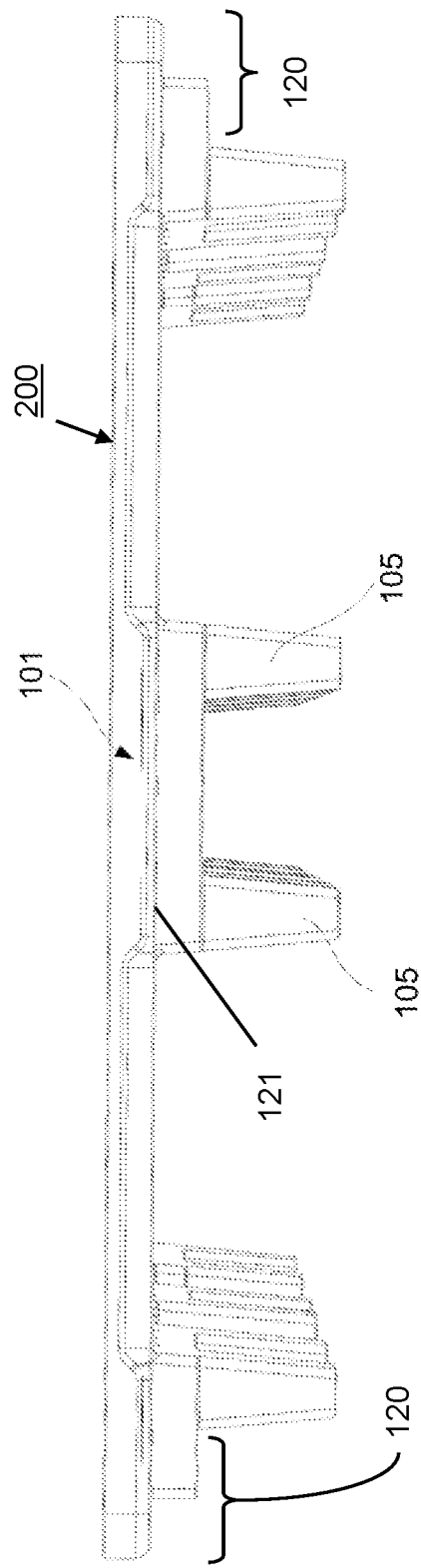

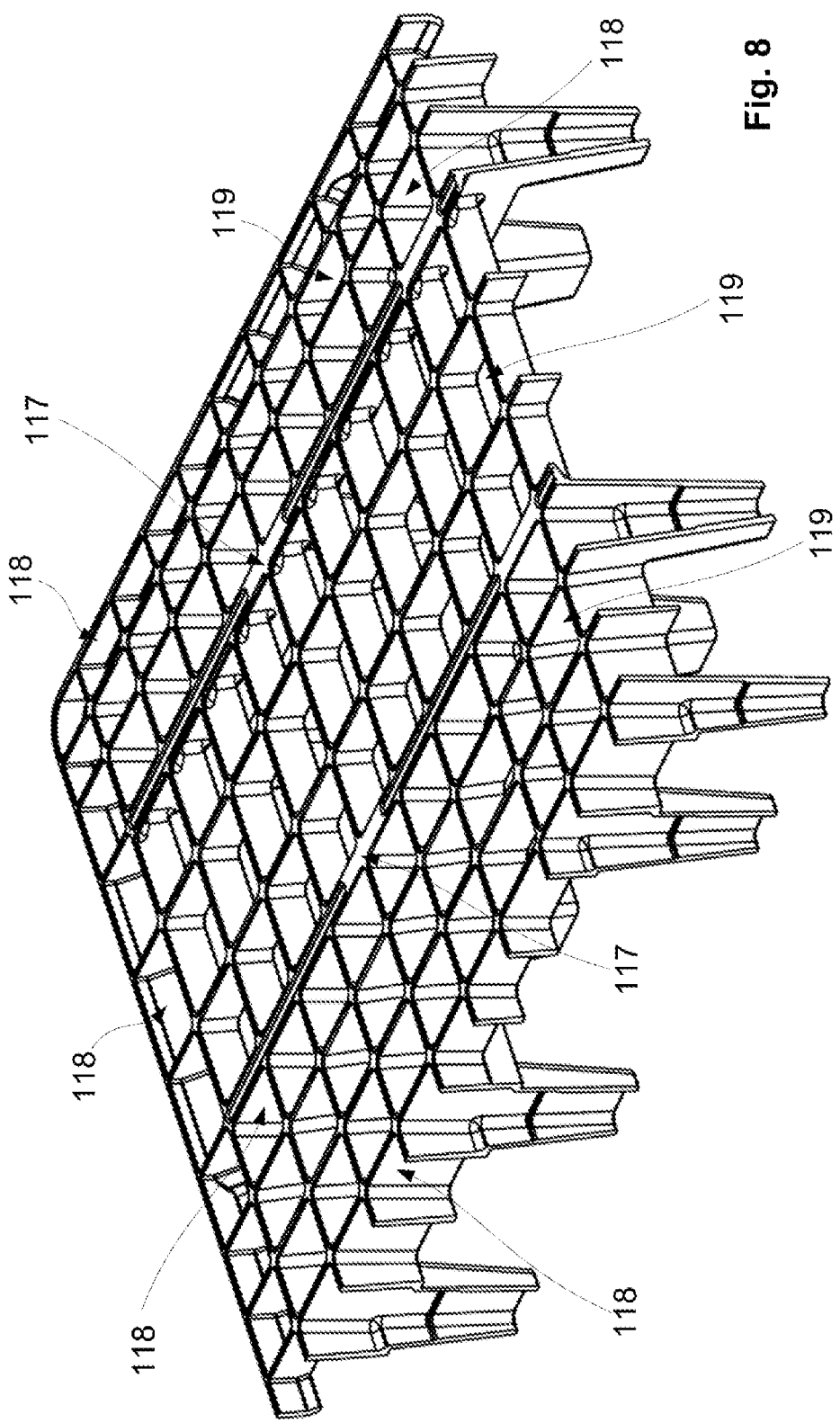

TRANSPORT PALLET

BACKGROUND

The disclosure is related to a transport pallet as described in detail herein.

Transport pallets are widely used in transportation of goods, of which a large portion is delivered with standard external dimensions and requirements to carrying capacity in accordance with European standard. The transport pallets offer a convenient handling by truck or hand pallet truck, and are stackable dependent of goods arranged upon the pallet. Transport pallets are produced of wood or plastic. Because of the material which must be included in the pallets to fulfil the requirements to carrying capacity, they are heavy to handle manually. Moreover, as a result, the weight of the pallet contributes to a total mass to be transported that provides a negative contribution to cost. Another disadvantage is that prior art pallets can be difficult to clean, in particular pallets of wood.

In order to provide a specific example, road transport of fish carriers to be loaded aboard a plane, is performed by stacking the fish carriers upon pallets before being loaded aboard a truck for transport to the airport. Most of the pallets are disposable pallets of wood. However, these pallets are quite heavy, between 12 and 20 kg, a weight which contributes to the payload and hence provides a negative contribution the transport cost. Then the fish carriers are loaded manually one by one by a vacuum lift to an airplane pallet (also called PMC aluminum flake) and stacked there. Then the pallet is disposed of and is not being reused. This constitutes an additional negative contribution to the cost of transport.

However, there are pallets of expanded poly styrene (EPS) which can be loaded directly upon the airplane pallets by truck. Hence, this transport and loading method requires less manual handling, and the pallets can follow all the way to the destination. However, if EPS pallets are to be reused for transport of food, such as fish, there are requirements to washability with respect to food hygiene.

However, airplane pallets have rails that encompasses the airplane pallet, and do typically add 5 cm in the horizontal direction. Hence, a dead space of 10 cm between adjacent pallets is created, which multiplies load height and total length of adjacent pallets aboard the cargo compartment.

SUMMARY

Provided herein is a transport pallet of this type having a higher bending strength than prior art pallets. The transport pallet has less material and hence less weight than prior art pallets. Further, the disclosed pallet is easier to clean than prior art pallets. During transport of palleted goods aboard a plane, the pallets allow one to utilize dead space between adjacent pallets in a cargo compartment, as described above. Further, the pallets may be stacked upon and into each other to reduce need for storage space and reduce transport costs.

The inventive pallet formed of integrated plastic for storage and/or transport of goods, comprises a first and second opposite short side and a first and second opposite long side, arranged between the short sides. The bearing surface of the pallet is constituted by a number of elongate ribs and a number of transversal ribs extending perpendicularly to the elongate ribs, wherein a number of legs extend down from the underside of the pallet bearing surface. Each leg is formed integrally with the pallet and as an extension of two opposite elongate leg rib sections and two opposite transversal leg rib sections. The leg rib sections are formed with a step defining an upper vertically extending rib section and a lower inclined rib section, so that each leg narrows in a direction away from the pallet bearing surface. Moreover, the transversal ribs exhibit a less vertical extension than the elongate ribs.

The angle of inclination of the lower inclined rib extension is about 5 degrees with respect to the vertical direction.

In order to simplify insertion of the forks of a hand pallet truck or fork lift, the underside of the pallet load bearing surface is advantageously provided with a rounded edge.

In order to increase the bending stiffness of the pallet further, half of the elongate ribs forming the legs exhibit a larger thickness than the remaining elongate ribs serving as reinforcement. In this way, the pallet is provided with increased bending stiffness but with minimal additional material consumption and minimal weight increase.

In a preferred embodiment, particularly for transport of boxes aboard airplanes, the legs closest to the short sides and the long sides of the pallet, respectively, are arranged a distance away from the respective short side and long side corresponding to the horizontal extension of a rail on an airplane pallet, typically about 5 cm.

The term "transport pallet" refers to a pallet for accommodation of goods which is not only to be transported, but which also can be stored stationary upon the same. The terms "transport pallet" and "pallet" are therefore used interchangeably.

The terms "long side/long sides" refer to opposite side edges of a rectangular pallet. The terms "short side/short sides" refer to opposite side edges, located between the long sides, in a rectangular pallet. However, the pallet can also exhibit a square geometry, but the terms "long side(s)" and "short side(s)" are also relevant to square pallets with the purpose of simplifying the description of the pallet. Accordingly, the long sides and the short sides of a square embodiment of a pallet can exhibit the same extension.

BRIEF DESCRIPTION OF THE DRAWINGS

FIG. 4A is a side view of an end of the pallet, FIG. 4B is a drawing similar to FIG. 4A, but with a section viewed partially from a short side, FIG. 8 is a drawing similar to FIG. 7 with illustration of a release analysis.

DETAILED DESCRIPTION

Figure 1:
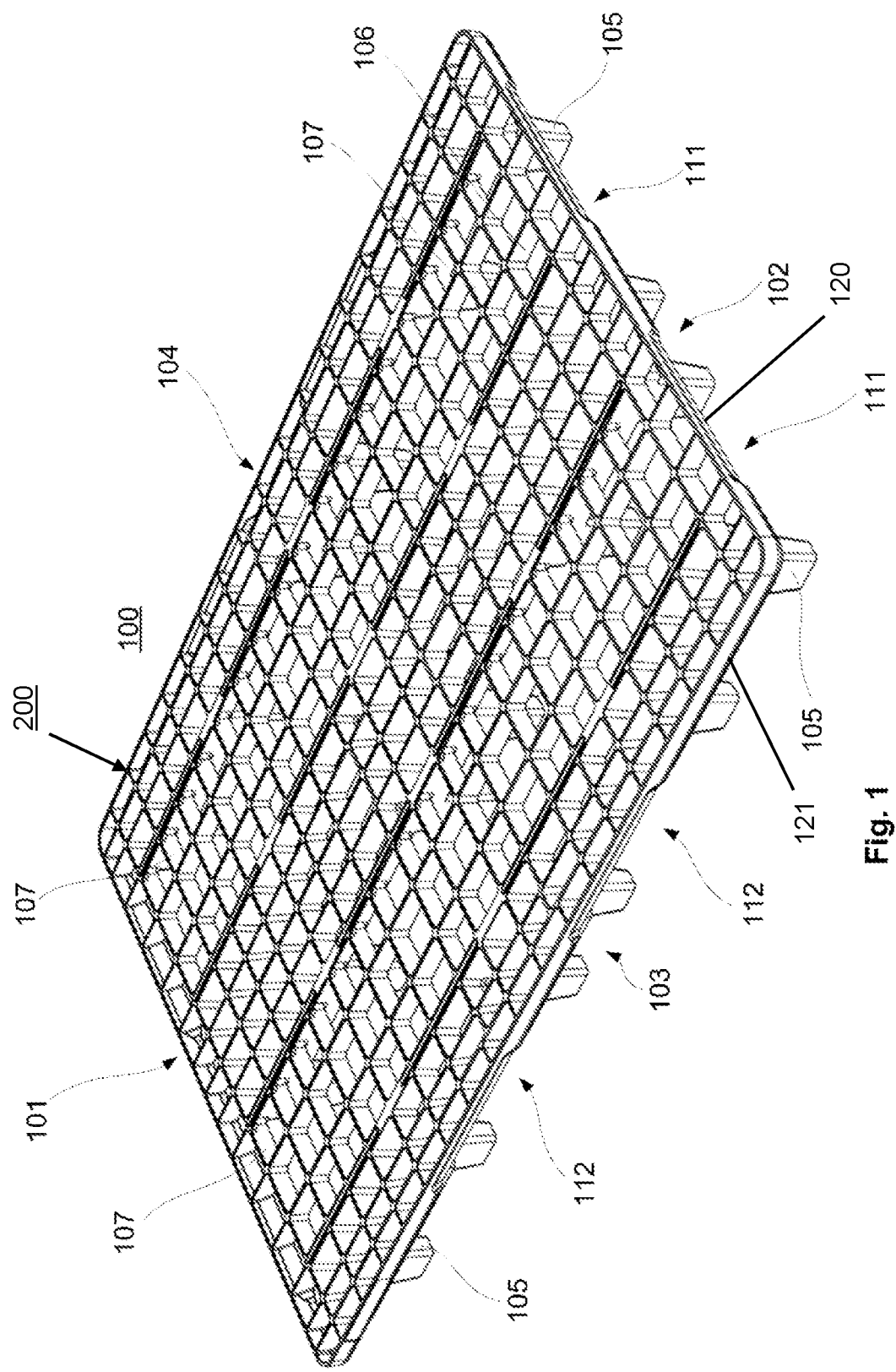
FIG. 1 shows an embodiment of a pallet in accordance with the disclosure in perspective from above.
Figure 2:
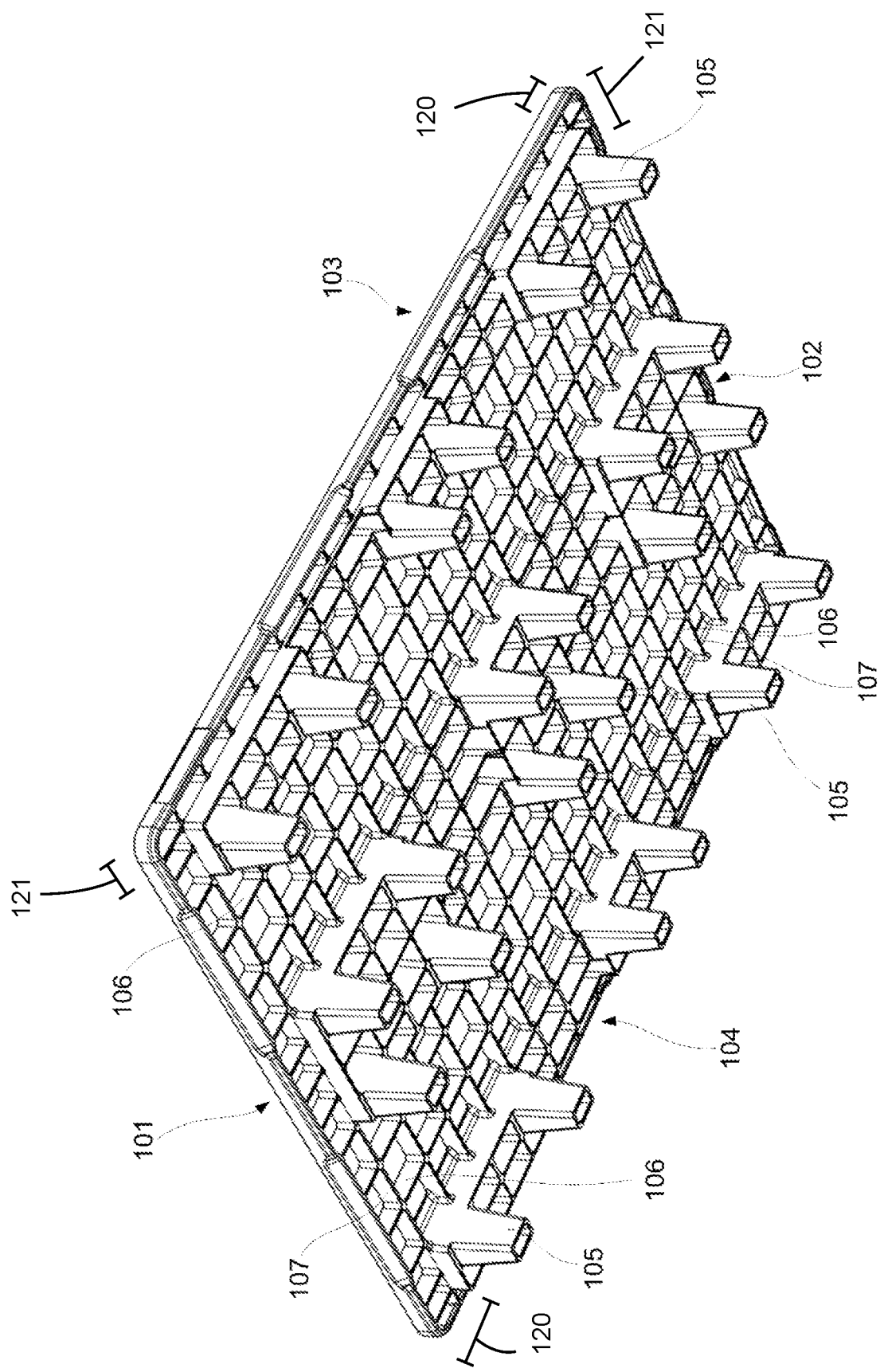
FIG. 2 shows the pallet in perspective from below.

FIG. 1 shows a pallet 100 in accordance with the disclosed embodiments viewed in perspective from above, whereas FIG. 2 shows the pallet in perspective from below. The pallet 100 comprises a first short side 101, a second opposite short side 102, a first long side 103 and a second opposite long side 104, so as to form a bearing/carrying surface 200 for goods there between for transport or storage.

The short sides and long sides are advantageously provided with a rounded lower edge (FIG. 4A) to simplify insertion of the forks of a hand pallet truck or fork lift. A number of legs 105 extend downward from the bearing surface 200, where compartments 111 between adjacent legs 105 of the respective short side 102 and 103 establish pockets for the forks of a hand pullet truck. Similar pockets 112 are formed between adjacent legs 105 of the respective long sides 103 and 105, so as to establish pockets for the forks of a fork lift.

Figure 3:
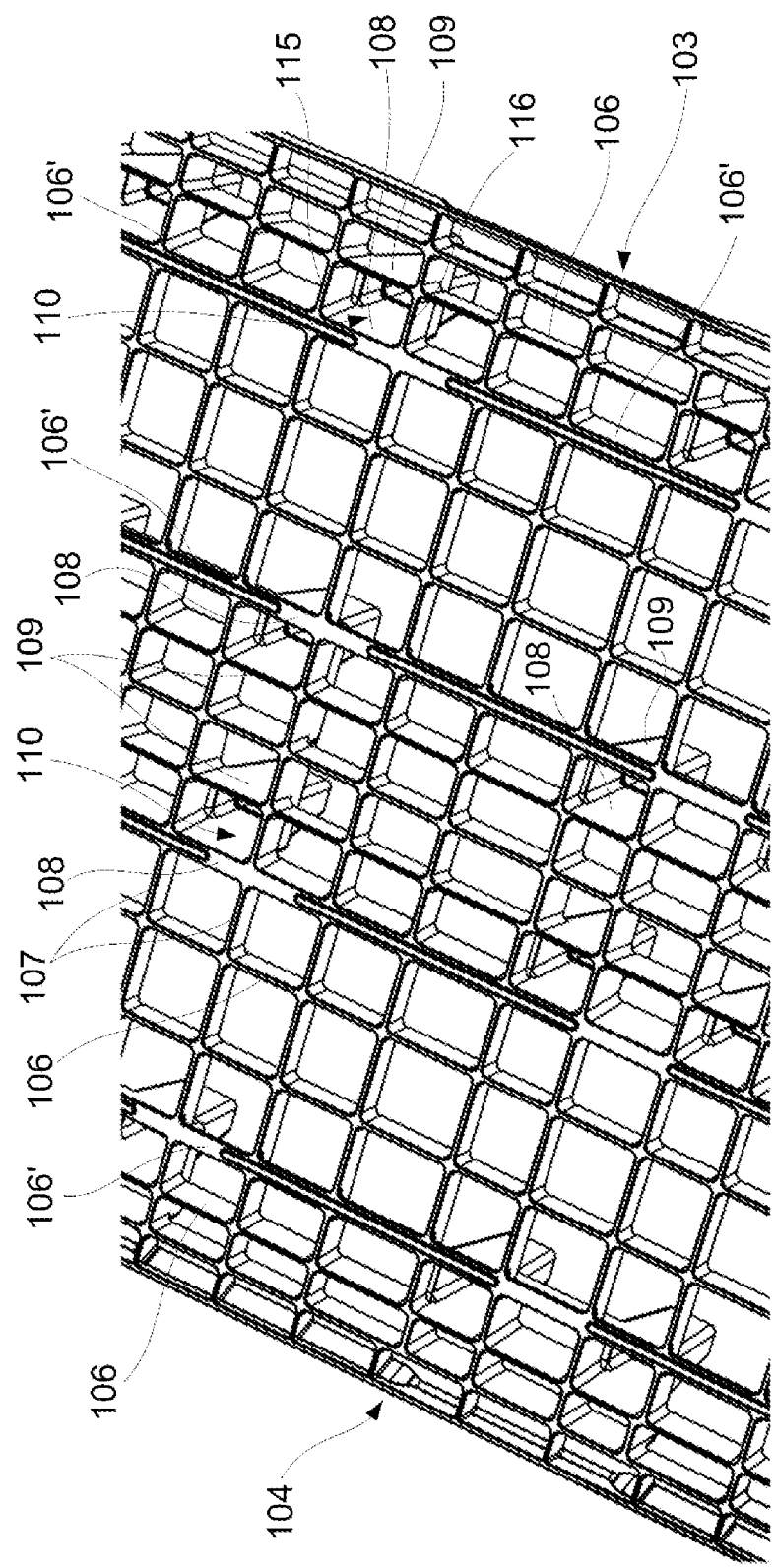
FIG. 3 shows a section of the framework of the bearing/carrying surface of the pallet from above.

Now with reference to FIG. 3, a section of the bearing surface is shown, consisting of a number of elongate ribs 106 and a number of transversal ribs 107 extending perpendicularly to the elongate ribs 106 and having their surface extending substantially perpendicularly when the pallet is resting upon a surface, thus forming the bearing surface 200 of the pallet. A number of pairs of adjacent elongate leg ribs 106 constituted by a first and second elongate rib section 108, 109 in the area forming the leg 105, are arranged at a mutual angle in a direction, so that the ribs 108 and 109 are approaching each other in a direction away from the bearing surface 200 of the pallet. The inclined elongate leg rib sections 108 and 109 with adjacent lateral rib sections 115 and 116 of two ribs 107 do in this way form a cavity 110 for accommodation of the leg 105 of another pallet stacked upon a first pallet. The angle of inclination of the elongate leg rib sections 108 and 109 is advantageously about 5 degrees with respect to the vertical. In an advantageous embodiment, half of the rib sections 108, 109, 115 and 116 forming the legs 105 exhibit a larger thickness than the remaining ribs 106, 107 and 109, and represents a reinforcing rib 108, but with minimal material consumption and minimal weight increase.

Figure 5:
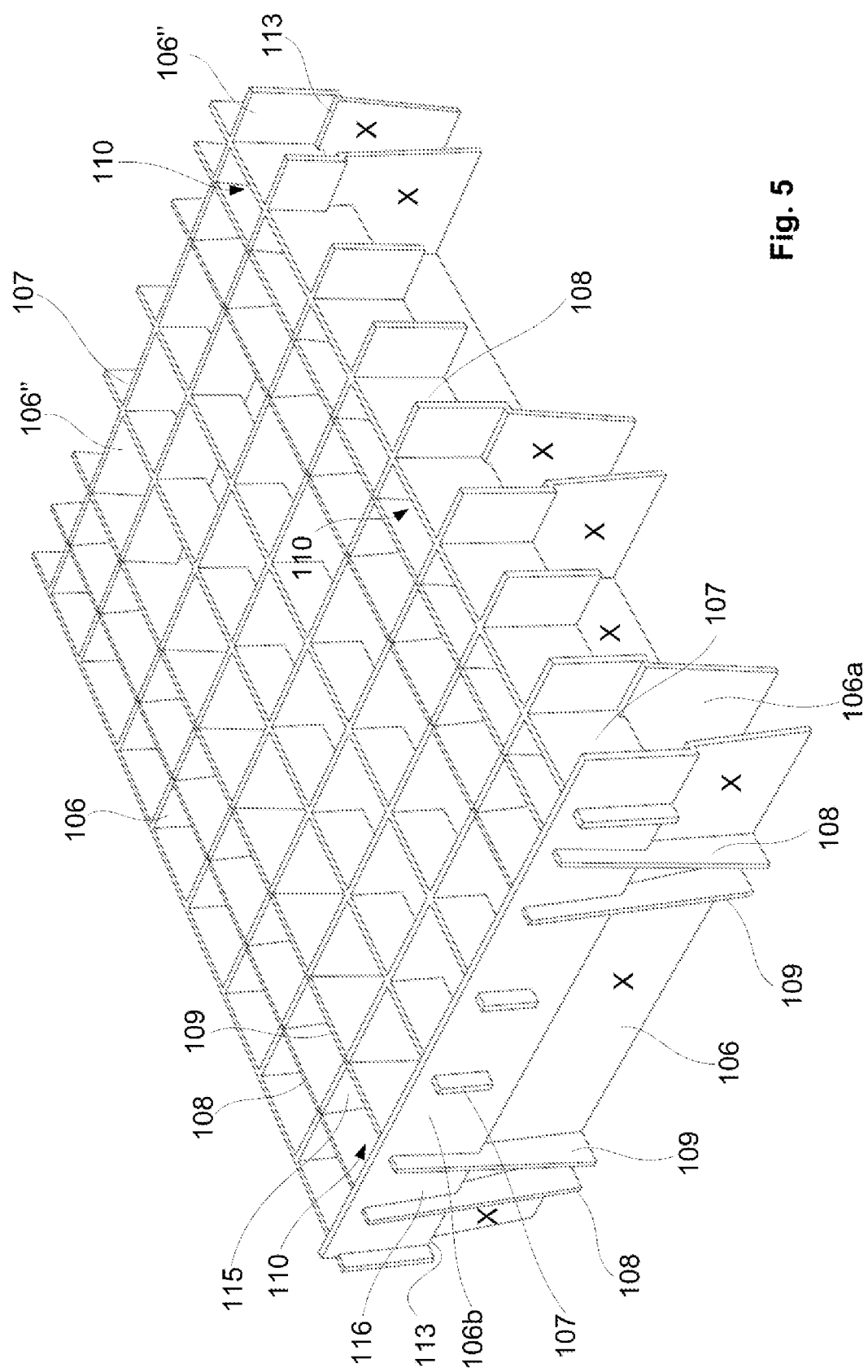
FIG. 5 shows a section of the framework of ribs viewed in perspective from above.
Figure 6:
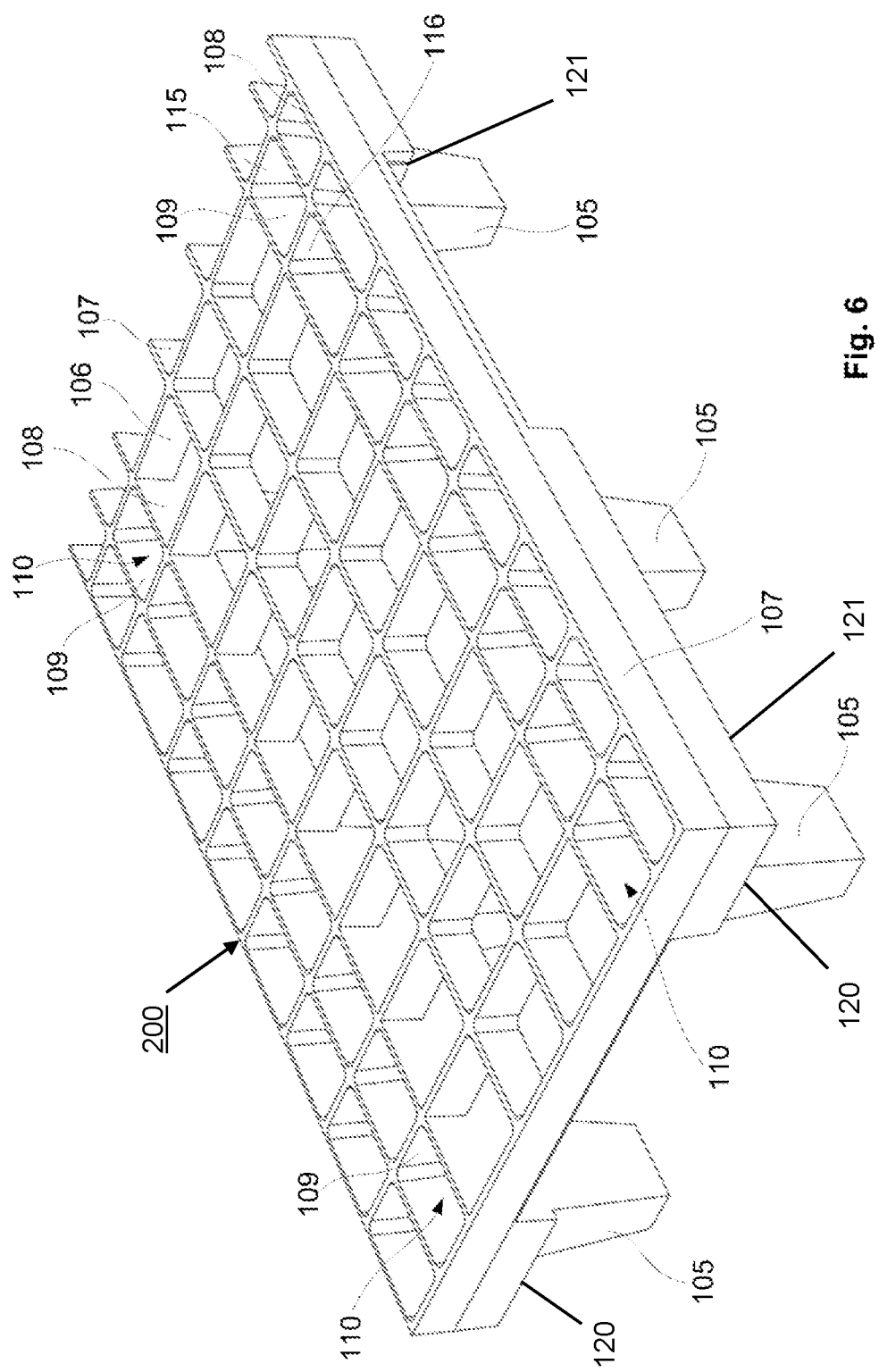
FIG. 6 is a drawing similar to FIG. 5, but where the virtual surfaces of the legs have been removed.

The framework of the pallet 100, which is cast in one piece, is illustrated in the form of a section in FIG. 5 having a frame in the form of the elongate ribs 106 and the transversal ribs 107. What is evident particularly from FIG. 5, the legs (not shown explicitly) are formed as an extension of four adjacent leg rib sections 108, 109, 115 and 116 of a respective elongate rib 106 and transversal rib 107, respectively, where each leg rib section 108, 109, 115 and 116 is formed with a break or step 113 a distance up from the underside of the pallet, so that the respective leg rib section is formed by an inclined lower part 106' and a vertically extending upper part 106". The transversal ribs are formed similarly (not shown). The surfaces marked X are virtual surfaces which are included to better illustrate the angle geometry of the framework. In FIG. 6 the virtual surfaces are removed to show a section of the framework of the pallet. FIGS. 4A and 4B are side views showing the angle geometry of the legs narrowing away from the bearing surface 200, formed as an extension of the ribs.

In order to utilize dead space between adjacent pallets with goods located upon a number of airplane pallets (not shown), the legs 105 are in a preferred embodiment closest to the long side and the short side of the pallets, respectively, arranged a distance away from the respective short side 101, 102 and long side 103, 104, thereby forming a respective overhang, 120, 121. This distance corresponds to the horizontal extension of the airplane pallet rail (not shown). In this way, pallets 100 placed in adjacent airplane pallets can with their respective bearing surfaces 200 be arranged close to each other, and utilize dead space between adjacent load carrying airplane pallets in accordance with the prior art. The placement of these legs and the overhangs appears in particular from FIGS. 1, 2, 4A, 4B and 6.

Figure 7:
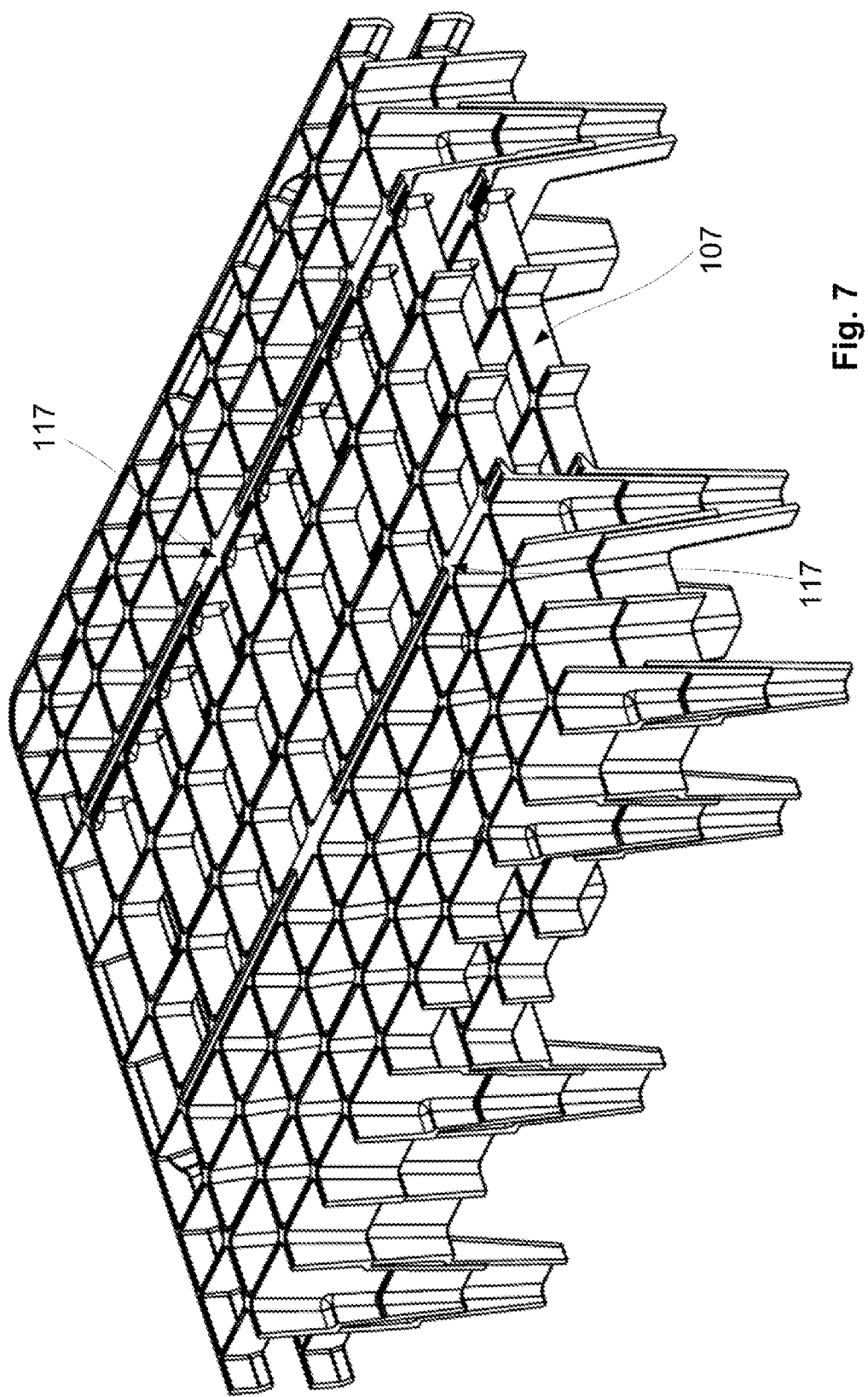
FIG. 7 is a drawing which in perspective shows two pallets stacked in and upon each other with a preferred embodiment of elongate ribs.

Now with reference to FIG. 7, a partial section is shown, of two pallets stacked upon each other. This illustration shows an alternative advantageous embodiment of the transport pallets. In order to provide solid legs having good washability, some elongate ribs arranged tilted across the entire longitudinal direction. These elongate tilted ribs are illustrated by reference numeral 117. This solution maximize the external cross-section of the leg, eliminating step points in the leg and eliminating steps in the elongate rib. However, the transversal ribs 107 are vertical. This is necessary to obtain continuous partition lines and properly arranged release directions. The leg of the wall in this area therefore must have a step to secure mutual stacking. Since the legs are elongate in the longitudinal direction of the pallet, the steps are arranged so that they weaken the leg strength as little as possible, i.e. at the lateral ribs 107.

FIG. 8 shows release directions within regions of the pallet, shown as a section in perspective of two pallets stacked upon each other. The rib sections marked by reference numeral 188 have a release direction in an upward direction, whereas the rib sections marked by reference numeral 119 have a release direction in a downward direction. This embodiment of the pallet is constructed by taking a starting point in the inclined elongate ribs 117, and then the walls of the transversal ribs 107 are adjusted to obtain continuous partition lines.

Finally is should be mentioned that lower part of each side edge (not further illustrated) is inclined, having lower art of the side edge in a direction away from the pallet, to reduce risk of damage at contact with fork lift. This involves that the pallet is lifted instead of being pushed in if the lifting fork should be positioned at a level too high. Inclined side edge also contributes to increased bending stiffness of the pallet.

The pallet has several advantages. Except from the upper side of the ribs, the pallet does not have horizontal surfaces or compartments, a feature which will be highly valuated with respect to cleaning. The rigid framework results in a substantial bend-stiff pallet compared to prior art pallets. In addition, the rounded edge contributes to increased bending stiffness. The framework and arrangement having the legs distributed along the underside of the pallet provides good load distribution towards the surface, and the pallet will not kneel from high load. Last but not least, the material consumption is very low compared to prior art pallets. The pallet is capable of carrying higher weight with half of the material consumption compared to the prior art. The different heights of the elongate ribs and the transversal ribs, respectively, having shorter vertical extension, results in a maximal stiffness and also results in reduced weight and material consumption.

Locating the legs closest to the long sides and the short sides a distance away from the same, particularly for load of e.g. boxes upon an airplane pallet aboard the cargo compartment of a typical transport plane, results in that the cargo compartment is able to accommodate about 168 boxes compared to maximum 161 boxes in accordance with the prior art. An EPS carrier with salmon accommodates about 10 kg fish. This means 140 kg additional fish in an airplane transport.

It should also be emphasized that the size of the pallet and the shape of the legs are formed, so that 8 pallets can be arranged on a standard so-called PNC airplane fright pallet. In addition, the pallet is preferably formed of a two-component polymer, of which one plastic component serves as friction coating, cast within the pallet. The friction coatings of this type is normally applied to the external of pallets after casting of the pallet itself.

REFERENCE NUMERALS 100 pallet/transport pallet
101 first short side of pallet 102 second short side of pallet
103 first long side of pallet
104 second long side of pallet
105 leg/supporting leg
106 elongate rib
107 lateral rib
108 first elongate leg rib section (reinforcing rib)
109 second elongate leg rib section
110 cavity in leg 105
111 hand pallet truck pocket
112 fork lift pocket
113 step
114 rounded edge
115 first elongate leg rib section
116 second elongate leg rib section
117 inclined elongate rib
118 upward pull direction of rib section
119 downward pull direction of rib section

The invention claimed is:

1. A pallet (100) formed of integrated plastic for storing or transporting goods, comprising:
   a first short side (101) and an opposite second short side (102) spaced from the first short side (101);
   a first long side (103) and an opposite second long side (104) spaced from the first long side (103), the long sides being arranged extending between the respective short sides,
   a pallet bearing surface (200) comprising numerous elongate ribs (106) and numerous lateral ribs (107) extending perpendicularly to the elongate ribs (106),
   numerous legs (105) extending downward from an underside of the pallet (100) bearing surface (200), each leg (105) being formed integrally as an extension of two opposite sections (115, 116) of two opposing elongate leg ribs (106) and two opposite sections (108, 109) of two opposing lateral legs (107), wherein
   each of the opposing sections (115, 116) of the leg ribs (107) and each of the opposing section (108, 109) of the lateral legs (107) is formed with a step (113) defining an upper vertically extending leg rib section (106') and a lower inclined leg rib section (106") such that each leg (105) narrows in a direction away from the pallet (100) bearing surface (200), and
   the transversal ribs (107) exhibit a smaller vertical extension than the elongate ribs (106).

2. The pallet of claim 1, wherein an angle of inclination of the lower rib extension (106") is approximately 5 degrees relative to the vertical direction.

3. The pallet of claim 2, wherein the legs (105) positioned closest to the short sides (101, 102) and to the long sides (103, 104), respectively, of the pallet (100) are arranged at a distance away from the respective short side (101, 102) and long side (103, 104) thereby forming a respective overhang (120, 121).

4. The pallet of claim 2, wherein multiple elongate ribs (106) are formed as an inclined rib (117) extending substantially perpendicularly to the lateral ribs (107).

5. The pallet of claim 2, wherein the pallet is formed of a two-component polymer with one component serving as friction coating.

6. The pallet of claim 1, wherein the underside of the pallet bearing surface (200) is provided with a rounded edge (114).

7. The pallet of claim 1, wherein half of the elongate rib parts (106', 108) forming the legs (105) are thicker than the remaining elongate ribs (106, 109) serving as a reinforcement.

8. The pallet of claim 7, wherein the legs (105) positioned closest to the short sides (101, 102) and to the long sides (103, 104), respectively, of the pallet (100) are arranged at a distance away from the respective short side (101, 102) and long side (103, 104) thereby forming a respective overhang (120, 121).

9. The pallet of claim 7, wherein multiple elongate ribs (106) are formed as an inclined rib (117) extending substantially perpendicularly to the lateral ribs (107).

10. The pallet of claim 7, wherein the pallet is formed of a two-component polymer with one component serving as friction coating.

11. The pallet of claim 2, wherein half of the elongate rib parts (106', 108) forming the legs (105) are thicker than the remaining elongate ribs (106, 109) serving as a reinforcement.

12. The pallet of claim 1, wherein the respective legs (105) positioned closest to the short sides (101, 102) and respective legs (105) positioned closest to the long sides (103, 104) of the pallet (100) are arranged at a distance away from the respective short side (101, 102) and respective long side (103, 104) thereby forming a respective overhang (120, 121).

13. The pallet of claim 12, wherein the distance is about 5 cm.

14. The pallet of claim 12, wherein multiple elongate ribs (106) are formed as an inclined rib (117) extending substantially perpendicularly to the lateral ribs (107).

15. The pallet of claim 12, wherein the pallet is formed of a two-component polymer with one component serving as friction coating.

16. The pallet of claim 1, wherein multiple elongate ribs (106) are formed as an inclined rib (117) extending substantially perpendicularly to the lateral ribs (107).

17. The pallet of claim 16, wherein the pallet is formed of a two-component polymer with one component serving as friction coating.

18. The pallet of claim 1, wherein the pallet is formed of a two-component polymer with one component serving as friction coating.

* * * * *